United States Patent [19]

Secord

[11] Patent Number: 4,546,666
[45] Date of Patent: Oct. 15, 1985

[54] MOUNTING STRUCTURE FOR THROTTLE CONTROL CABLE

[75] Inventor: Nelson W. Secord, Brighton, Mich.

[73] Assignee: Chrysler Corporation, Highland Park, Mich.

[21] Appl. No.: 659,204

[22] Filed: Oct. 9, 1984

[51] Int. Cl.[4] .............................................. F16G 1/14
[52] U.S. Cl. .................... 74/501 P; 74/513; 403/353; 24/128; 24/130
[58] Field of Search ............... 74/501 R, 501 P, 513; 403/353; 24/130, 128

[56] References Cited

U.S. PATENT DOCUMENTS

| 541,729 | 6/1895 | Dillin | 24/128 R |
|---|---|---|---|
| 1,426,945 | 8/1922 | Anderson | 24/130 |
| 4,458,552 | 7/1984 | Spease et al. | 74/501 P |

FOREIGN PATENT DOCUMENTS 2237301  3/1973  Fed. Rep. of Germany ........ 74/513

Primary Examiner—Kenneth J. Dorner
Attorney, Agent, or Firm—Edward A. Craig

[57] ABSTRACT

Mounting structure is provided for the throttle control cable of an internal combustion engine. The mounting structure connects the throttle control cable to a gas pedal actuated lever. The mounting structure includes a retainer for securement to the control cable and an elastomeric grommet for receiving the retainer. This structure results in isolating the gas pedal and associated lever from vibrations of the throttle control cable caused by its connection to the internal combustion engine.

6 Claims, 5 Drawing Figures

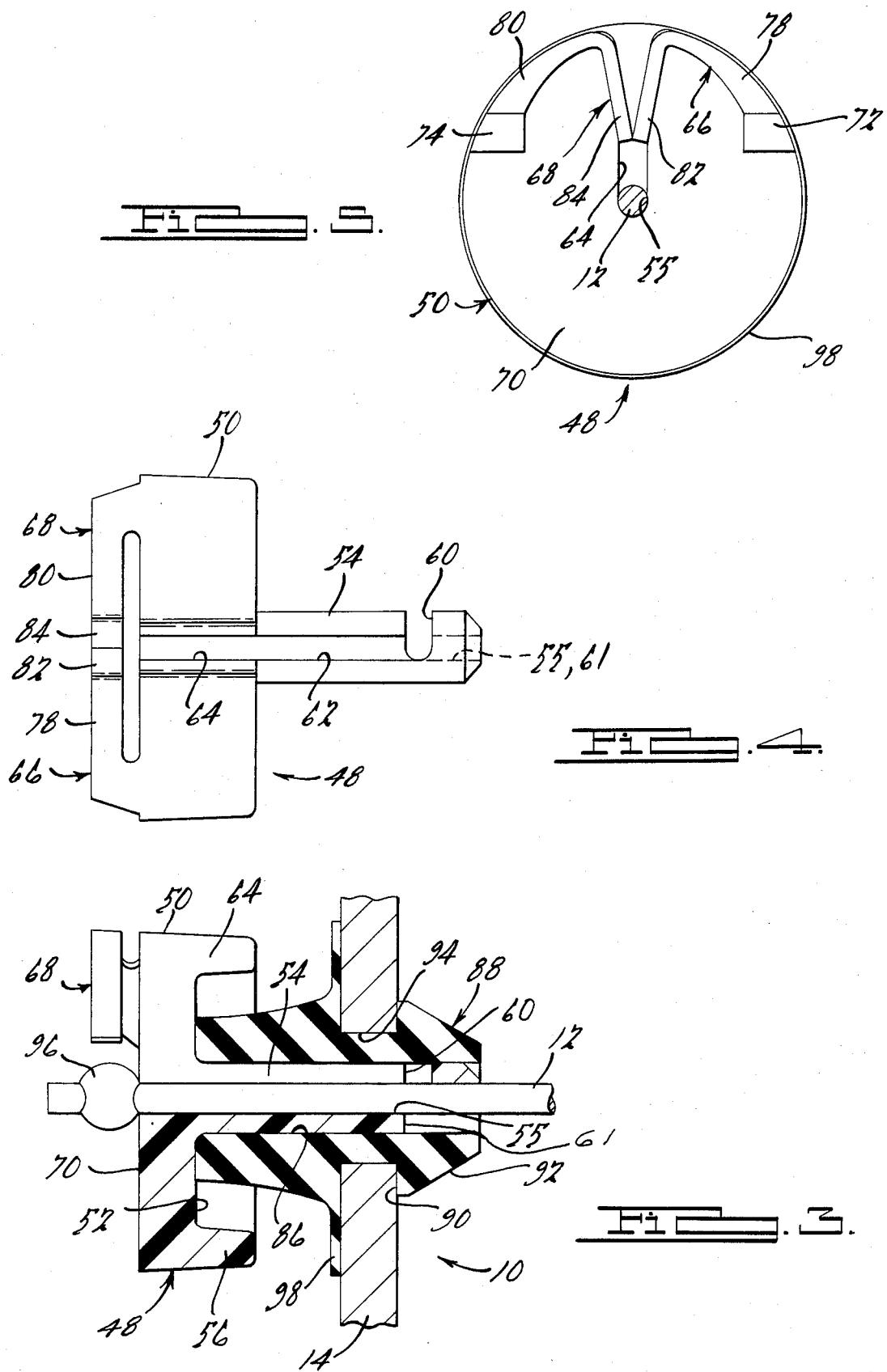

MOUNTING STRUCTURE FOR THROTTLE CONTROL CABLE

BACKGROUND OF THE INVENTION

As is well known, internal combustion engines are generally used to power automobiles. The driver controls the throttling rate of the engine by means of a foot pedal conveniently mounted internally of the car on the dash panel and easily accessible to the driver's foot. The gas pedal is connected to a lever which in turn is connected to one end of a throttle control cable. The throttle control cable passes through the dash panel into the engine compartment where it is connected to the throttle for actuation thereof. The driver increases or decreases the speed of the automobile by pressing down or letting up on the gas pedal.

In operation of a vehicle, the driver's foot constantly presses against the gas pedal. In the past, engine vibration has been transmitted to the gas pedal via the throttle control cable. This vibration, through slight, exerts a constant stress against the foot of the driver causing fatigue and annoyance.

The present invention provides a mounting structure to connect the throttle control cable to the lever actuated by the gas pedal. The mounting structure includes means for isolating the gas pedal from vibrations transmitted by the throttle control cable. The mounting structure is inexpensive to manufacture, of easy installation, and results in a positive mount.

SUMMARY OF THE INVENTION

The mounting structure for throttle control cable includes a cable retainer adapted for reception in an elastomeric grommet mounted on a throttle lever actuatable by a gas pedal. The cable retainer has a head portion including an obverse face and a reverse face. A tubular portion extends axially outwardly from the obverse face. The tubular portion defines a passageway which also extends entirely through the head portion. The passageway is for the reception of the throttle control cable. The tubular portion has a transverse slot intermediate the ends thereof communicating with the passageway. A first longitudinally extending slot is provided in communication with the passageway extending from the transverse slot to the outer end of the tubular portion. A second longitudinal slot is provided in communication with the passageway extending from the transverse slot to the head portion. The head portion has a slot extending from the outer periphery thereof into communication with the passageway and with the second longitudinal slot whereby a flexible throttle control cable may be received in the passageway by first inserting a portion thereof through the transverse slot and then flexing the cable to pass through the first longitudinal slot, the second longitudinal slot and the slot in the head portion. The head portion has trap means on the reverse face thereof in alignment with the slot in the head portion permitting passage of the cable into the passageway while preventing passage of the cable out of the passageway.

IN THE DRAWINGS

FIG. 3 is a longitudinal sectional view of the mounting structure for throttle control cable after assembly;

FIG. 4 is a side elevational view of the cable retainer forming part of the mounting structure for throttle control cable; and FIG. 5 is an end view of the cable retainer with the cable illustratively in place.

DETAILED DESCRIPTION

Figure 1:
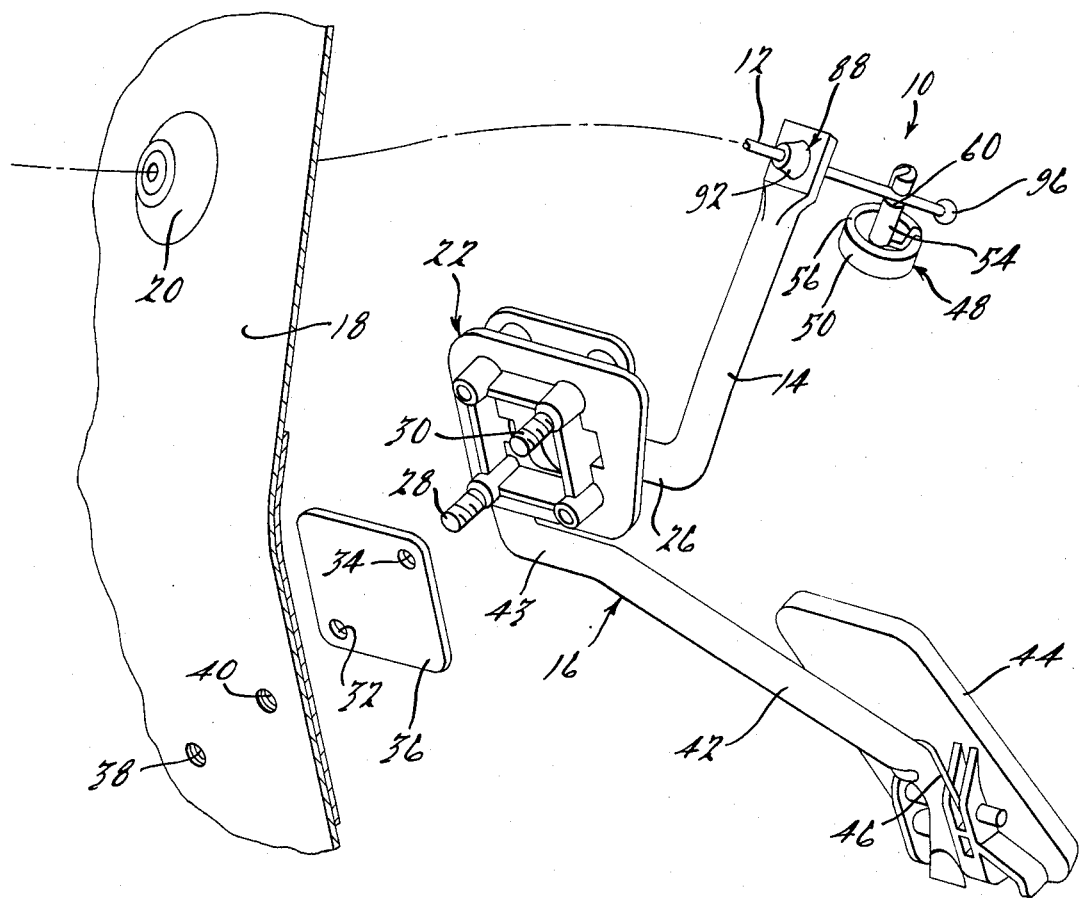
FIG. 1 is a view in perspective of the mounting structure for throttle control cable and associated structure shown in the disassembled condition.

Referring to FIG. 1, it will be noted that the mounting structure for throttle control cable 10 serves the purpose of operatively connecting the throttle control cable 12 to lever portion 14 of a gas pedal lever 16. The cable 10 extends through the dash panel 18 thence into an engine compartment where it is operatively connected to the throttle of an internal combustion engine carburetor, (not shown). A protective rubber grommet 20 is provided in the dash panel 18 to safeguard the cable 12 against abrasion.

The lever portion 14 extends outwardly from a mounting bracket 22. Lever portion 14 is joined to a U-shaped portion, one leg 26 of which is suitably journaled in bracket 22 to permit pivoting of the gas pedal lever 16. Threaded bolt portions 28, 30 extend from the underside of the bracket 22 for ultimate insertion through openings 32, 34 provided in mounting past 36 and thence through registering openings 38, 40 provided in the dash panel 18 for ultimate securement of the bracket 22 onto the dash panel 18 by means of nuts (not shown).

A second lever portion 42 of the gas pedal lever 16 extends outwardly from leg 43 into pivotal connection with a gas pedal 44. A spring structure 46 urges the gas pedal 44 into an at rest position. When the gas pedal 44 is depressed, it is free to pivot so as to accommodate itself to the movement of lever portion 42 thereby resulting in foot comfort for the vehicle operator. Depression of the gas pedal 44 causes the lever portion 42 to pivot in the clockwise direction as viewed in FIG. 1. This results in similar clockwise movement of the lever portion 14, which movement results in pulling the throttle control cable 12, thus affecting the setting of the throttle as desired.

The key element of the mounting structure for throttle control cable 10 is a cable retainer 48. The retainer 48 is shown in all of the views. The retainer 48 is preferably fabricated of a plastic material. The retainer 48 is composed of a cylindrical head portion 50 having on obverse face 52 (the front or principal face) from which a tubular portion 54 extends axially outwardly. A peripheral flange 56 also extends axially outwardly from face 52 to thereby define with face 52 a recess. The tubular portion 54 defines an interior longitudinally extending passageway 55 which continues entirely through the head 50. A transverse slot 60 is provided in tubular portion 54 adjacent the outer end thereof in communication with passageway 55. A first longitudinal slot 61 is provided in the tubular portion 54 in communication with passageway 55 and extending from transverse slot 60 to the outer end of the tubular portion 54. A second longitudinal slot 62 is provided in the tubular portion 54 in communication with passageway 55. The slot 62 extends from the slot 60 for the entire length of the tubular portion 54. The head portion 50 has a slot 64 extending from the outer periphery into communication with passageway 55 and slot 62.

Figure 2:
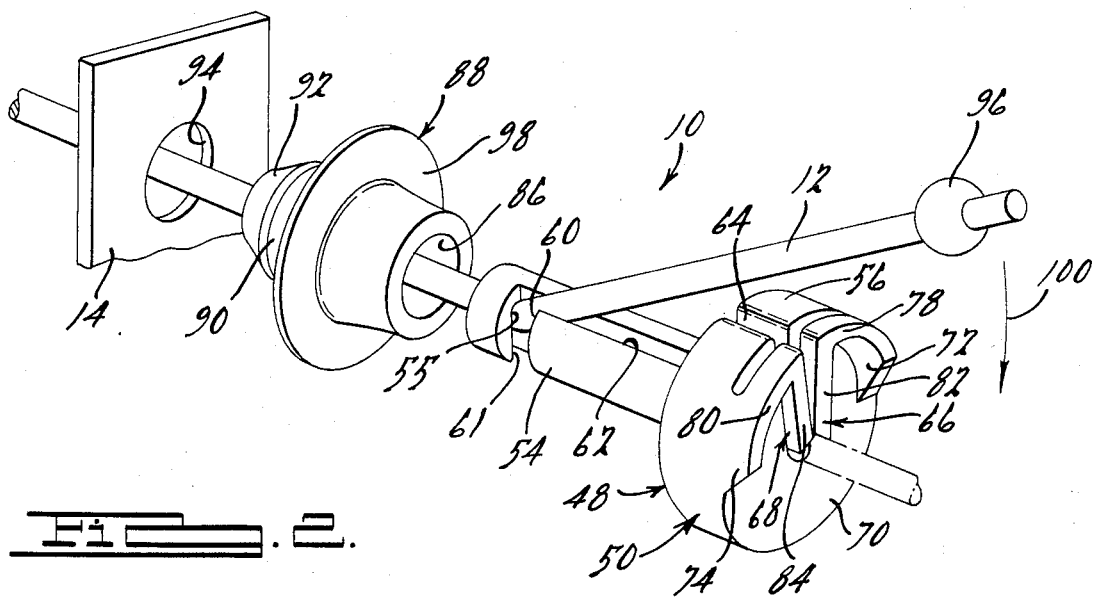
FIG. 2 is a view in perspective of the mounting structure for throttle control cable shown in the disassembled condition illustrating the method of assembly.

The structure of the cable retainer 48 is completed by means of a pair of oppositely disposed flexible arms 66, 68 provided on the reverse face 70 of the head portion 50. The arms 66, 68 are made integral with the head 50 at 72, 74. The arms 66, 68 are spaced from the face 70 as will be noted in FIGS. 2 and 4. Each arm has a first portion 78, 80 which extends from an attachment point 72, 74 parallel to the periphery of the head 52 towards the slot 64 and terminates at the slot 64. Free end arm portions 82, 84 extend from portions 78, 80 towards the passageway 55 and towards each other to terminate at a point adjacent to the passageway 55. The ends of portions 82, 84 touch at their termination points to thereby define a V-shape as will be noted in FIGS. 2 and 5. The function of the flexible arms 66, 68 is to flex outwardly and permit passage of the throttle control cable 12 into the passageway 55 but prevent passage of the cable therefrom.

The tubular portion 54 of cable retainer 48 is received within an elongated opening 86 of cylindrical elastomeric grommet 88. The grommet 88 is fabricated of rubber or similar material. The grommet 88 has a peripheral recess 90 adjacent to a conical head 92. The head 92 may be forced through an opening 94 provided in the lever portion 14 whereby portions of the lever are received in the recess 90 to thereby secure the grommet 88 to the lever portion 14 as may be noted in FIG. 3. As will also be noted in FIG. 3, the tubular portion 54 of retainer 48 is snugly received within the elongated opening 86 of grommet 88 when these elements are in the assembled position, with an elongated tubular portion of the grommet received within, and surrounded by, flange 56 and the end thereof abutting against the obverse face 52. A ball-like stop element 96 is fixedly mounted near the end of the throttle control cable 12 to abut against the reverse face 70 of retainer head 50 to thereby prevent escape of the cable. The diameter of element 96 is greater than the diameter of the passageway 55 or the width of the slot 64.

The grommet 88 also has a radially outwardly extending flange 98 which extends from the edge of the recess 90 and abuts against the lever portion 14. The flange 98 functions as a resilient barrier between metallic lever portion 14 and the flange 56 of plastic retainer 48 in the event that the retainer 48 bottoms out during operation of the structure.

Assembly and operation of the mounting structure for the throttle control cable may now be understood. Referring to FIG. 1, it will be noted that the throttle control cable 12 is threaded through the grommet 20 and the grommet 88. The cable 12, as previously mentioned, is flexible and may be fabricated of twisted wire strands. After the cable is threaded through the grommets, the retainer 48 is mounted thereon. As will be noted in FIG. 1, the retainer 48 is first positioned to receive the cable 12 in the transverse slot 60. Then, as will be noted in FIG. 2, the cable 12 is flexed into a position where it is receivable in the longitudinal slots 61, 62 and will pass between flexible arms 66, 68. Movement of the cable in the direction of arrow 100 as viewed in FIG. 2 will result in positioning of the cable in the passageway 55 and passage of the cable beyond the ends of free end arm portions 82, 84. These portions will flex as the cable is passed thereby. However, once the cable has passed thereby, the entire flexible arm structure will return to the configuration shown in FIG. 5 to thereby close the opening through which the cable passed and prevent repassage of the cable. This results in the cable being securely fastened within the retainer 48. As will be noted, longitudinal slots 61, 62 in tubular portion 54 are diametrically opposed. This construction holds the cable in place until the cable retainer is mounted in grommet 88. After the retainer 48 has been mounted on the cable 12, the tubular portion 54 is forced into the passageway 86 of the grommet 88 to result in the assembled position shown in FIG. 3.

In operation of the structure described, vibration of the cable 12 is dampened by the grommet 88 and consequently is not transmitted through the gas pedal lever 16 to the gas pedal 44. Thus, normal vibration associated with engine operation as reflected by the throttle control cable 12 is not transmitted to the gas pedal 44 upon which the foot of the vehicle operator normally presses. Such vibration of the gas pedal 44 is undesirable as it places a stress on the vehicle operator causing him fatigue and annoyance.

As will be appreciated from the description of the method of installing the retainer 48 onto the cable 12, this operation occurs after the cable 12 has been mounted with respect to its operating structure. This permits assembly of this structure without having first to mount the retainer 48 which is advantageous from a manufacturing viewpoint. Also, in the event of failure of retainer 48 in use, the retainer may be replaced without having to disassemble the entire throttle control cable structure.

During operation of a vehicle, the vehicle operator may press very hard on the gas pedal 44 compressing and causing collapse of portions of the elastomeric grommet 88 with resultant bottoming out of the retainer head 50. The provision of the enlarged flange 98 on the grommet 88 permits the flange 56 of the retainer 48 (containing the collapsed grommet material) to abut thereagainst during bottoming and results in spreading of the bottoming force over a relatively large area. While transmission of vibrating forces to the gas pedal 44 cannot be prevented during such bottoming, the integrity of the retainer head 50 is maintained by reason of the resilient area between it and the metal lever portion 14. If such barrier were not present, damage could occur to the retainer 48. By providing a relatively large surface of the flange 98 and included grommet material to come in contact with the retainer 48, the life of the grommet 88 is extended, it being appreciated that such bottoming action may occur frequently depending upon the driving habits of the vehicle operator. If the contacted area during bottoming were smaller, the grommet flange 98 would soon wear.

Having described my invention, I claim:

1. Mounting structure for throttle control cable comprising a cable retainer adapted for reception in an elastomeric grommet mounted on a throttle lever actuatable by a gas pedal, said cable retainer having a head portion including an obverse face and a reverse face, a tubular portion extending axially outwardly from the obverse face, said tubular portion defining a passageway which also exetnds entirely through the head portion, said passageway being for the reception of a throttle control cable, said tubular portion having a transverse slot intermediate the ends thereof communicating with said passageway, a first longitudinal slot in communication with said passageway extending from said transverse slot to the outer end of the tubular portion, a second longitudinal slot in communication with said passageway extending from said transverse slot to said head portion, said head portion having a slot extending from the outer periphery thereof into communication with said pasageway and second longitudinal slot whereby a flexible throttle control cable may be received in said passageway by first inserting a portion thereof through the transverse slot and then flexing the cable to pass through the first longitudinal slot, the second longitudinal slot and the slot in the head portion, said head portion having trap means on the reverse face thereof in alignment with the slot in the head portion permitting passage of the cable into said passageway but preventing passage of the cable out of said passageway.

2. Mounting structure as set forth in claim 1, further characterized in that said first and second longitudinal slots in the tubular portion are diametrically opposed.

3. Mounting structure as set forth in claim 1, further characterized in the provision of said elastomeric grommet, said grommet having an elongated opening therethrough, said tubular portion being snugly received in said opening, said grommet damping vibrations of the tubular portion caused by the throttle control cable vibration.

4. Mounting structure as set forth in claim 3, further characterized in that said grommet has an elongated tubular portion extending into contact with the obverse face of said retainer head portion, said head portion having a peripheral flange extending axially outwardly from said obverse face to surround but be normally spaced from said grommet elongated tubular portion, said grommet having a radially outwardly exending flange for abutment against said throttle lever and from which the grommet elongated tubular portion extends whereby upon compression and collapse of the last mentioned tubular portion as a result of actuation of said throttle lever, the tubular portion will be contained within said peripheral flange of the head portion with said radially outwardly extending flange of the grommet serving as a resilient barrier between said retainer and said throttle lever.

5. Mounting structure as set forth in claim 1, further characterized in that said trap means comprises a pair of oppositely disposed flexible arms secured to the reverse face of the retainer head portion and spaced therefrom, said arms having free end portions extending from a point radially outwardly from the passageway through the head portion towards said passageway and towards each other to terminate at a point short of said passageway and touching each other to define a V-shape, said free end portions flexing outwardly to permit passage of the cable into said passageway but thereafter preventing passage of the cable out of said passageway.

6. Mounting structure as set forth in claim 1, further characterized in the provision of a stop element for fixed securement to said throttle control cable at a point opposite from said reverse face of the cable retainer head portion, said stop element being larger than the diameter of the pasageway through the head portion to prevent the throttle control cable slipping from the cable retainer and permit pulling of the cable to perform its throttling function.

* * * * *